No. 727,582. Patented May 12, 1903.

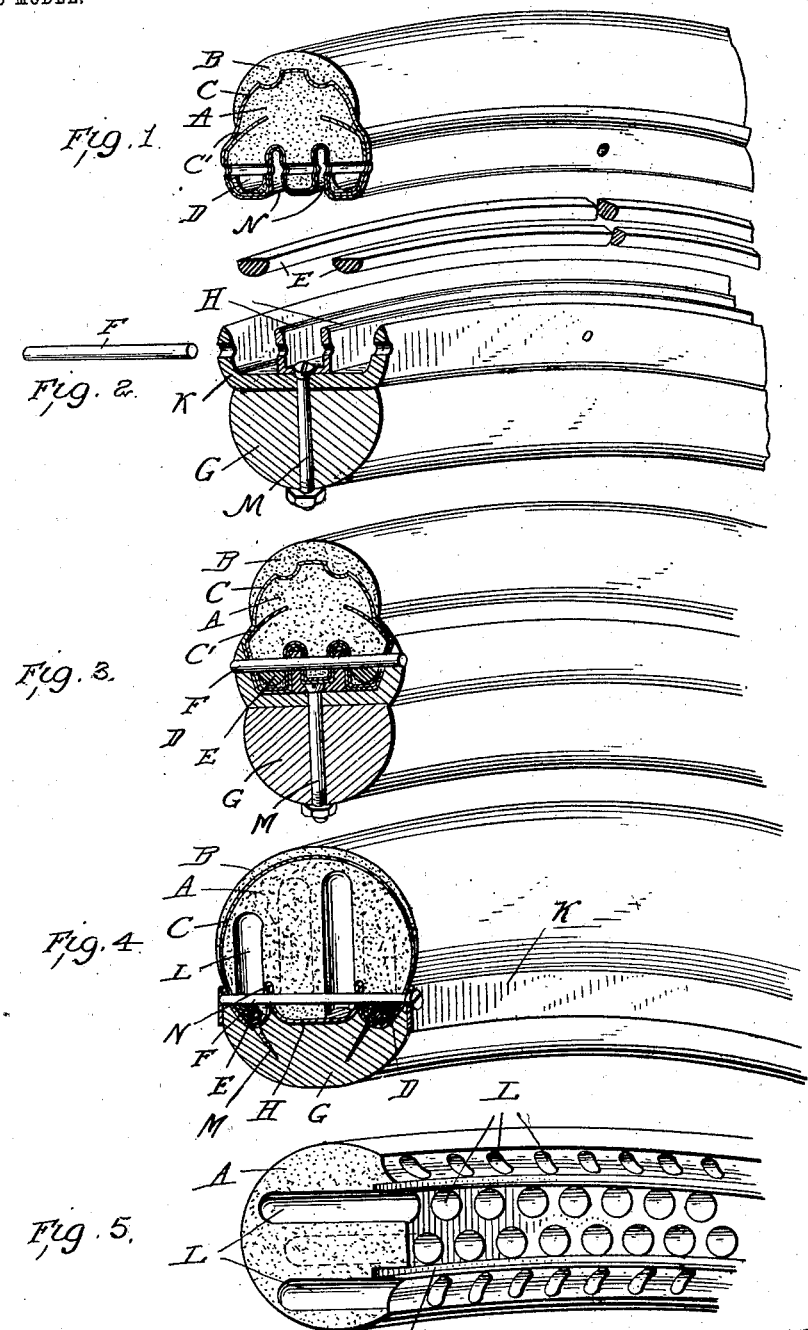

UNITED STATES PATENT OFFICE.

ARCHIBALD H. BRINTNELL, OF TORONTO, CANADA, ASSIGNOR TO DONALD JAMES McKINNON, OF ST. CATHERINES, CANADA.

RUBBER CUSHION-TIRE FOR VEHICLES.

SPECIFICATION forming part of Letters Patent No. 727,582, dated May 12, 1903.

Application filed May 4, 1901. Serial No. 58,833. (No model.)

*To all whom it may concern:*

Be it known that I, ARCHIBALD H. BRINTNELL, a citizen of Canada, residing at the city of Toronto, in the county of York and Province of Ontario, Canada, have invented a new and useful Rubber Cushion-Tire for Vehicles, of which the following is a specification.

My invention relates to improvements in rubber cushion-tires such as are used on horse and horseless carriages, bicycles, &c., in which I employ a new feature in securing the rubber tire to the metal flanged tire, and I also employ a new feature in making my tire tight and at the same time strong to resist weight; and the objects of my invention are, first, to provide a rubber cushion vehicle-tire which can be easily adjusted to or removed from a wheel without the use of specially-made and expensive tools; second, to provide a rubber cushion vehicle-tire which can be made very light by the cellular formation, as shown in Figs. 4 and 5 of the annexed drawings, and at the same time be strong to resist weight and resilient in its action on the road; third, to provide a rubber cushion-tire for the bicycle which will prevent the annoying punctures, thereby avoiding the trouble and time taken to inflate the tire with air, and which will secure to the rider the comfort of knowing his tire will not fail him so far as resiliency is concerned and can be easily repaired anywhere on the roadside without a skilled mechanic.

I attain these improvements by the new and novel construction as illustrated in the accompanying drawings, in which—

Figure 1 is a side elevation of my tire in perspective as it is before being adjusted to the wheel. Fig. 2 is a side elevation in perspective of the metal tire with flanges and a center small metal channel, which is secured by the usual tire bolts or screws, the wooden portion of the rim being broken away. Fig. 3 is a side elevation in perspective of my tire adjusted to the rim of an ordinary horse-carriage as it would appear when ready for use. Fig. 4 is a side elevation in perspective of my tire as it is constructed for the bicycle. Fig. 5 is a bottom elevation in perspective of my bicycle-tire, showing the cellular formation in that central portion of the tire which is composed only of rubber or other suitable flexible material around which a covering is placed composed of a strong flexible fabric, including a tread-strip.

Similar letters refer to similar parts throughout the several views.

Letter A is the central body portion of my tire, composed of rubber or other suitable material, which is surrounded by a strong flexible fabric, the inner part of which is fastened or anchored in the body of the tire. The body of the tire is also provided with a cellular formation consisting in holes in suitable distance from each other and at right angles with the length of the tire and preferably running from bottom to top. This cellular formation is for the purpose of making the tire tight and at the same time strong to resist weight, as these cells are from eight to ten times stronger (to resist weight) standing at right angles to the tread and rim than they would be when parallel with the rim and tread. This plan of cellular formation not only secures lightness and strength, but also the resiliency required in an easy-running tire.

The under portion of the body of the tire is provided with two grooves running the whole length of the tire and a certain distance therein near the center, forming a center portion or strip and two outside portions or strips which are surrounded by a strong flexible fabric, by which holes are formed at the bottom of the outside portions for the purpose of receiving an anchor-strip or wire, which also runs the whole length of the tire. These grooves are made to receive the flanges of the small center channel, which channel and grooves may not be used on the smaller-sized tires, as they are employed for the purpose of giving greater strength to the cross-rivets which pass over the anchor-strip and are the means by which the tire is held in place.

The body portion of my tire is also provided with a tread-strip, which may or may not have grooves and ribs to fit, as required.

Letter B is the tread-strip just mentioned and may be constructed with ribs on the inside to fit grooves in the body portion of the tire or may be smooth, if so required.

Letters C and C' represent the strong flexible fabric passing around the tire and an inner portion which passes around the bottom of the tire, the upper edges being fastened or anchored in the body of the tire, by which holes are formed in the bottom edges of the two strips connected to the body portion of the tire. In these holes are passed anchor-strips of any desired length or a wire in one piece running the whole length of the tire, which act in conjunction with the cross-rivet as a means of holding the tire in place.

Letter D represents the two holes in the outside bottom edges of the tire-strips, around which the strong flexible fabric passes and into which the anchor-strips or wires are placed.

Letter E is the anchor-strip or wire already described.

Letter F is the cross-rivet which passes over the anchor-strip through holes in the flanges of the metal tire and the flanges of the center channel, which holes are in alinement, all of which are easily adjusted and form a very secure means of holding the tire in place, as any desired number of rivets may be used.

Letter G is the rim of the wheel, which may be made in the usual way and of any suitable material.

Letter H is the center channel, which may be made of any suitable material and size and is constructed for the purpose of giving greater strength to the cross-rivets, which, in connection with the anchor-strips and outside tire-flanges, hold my tire in place.

Letter K is the flange of the metal tire, through which holes are bored to receive the cross-rivets.

Letter K' is a metal lining forming a flange such as I use for wooden rims on the bicycle. The center channel is produced by forming flanges on this metal lining, through which holes are bored in alinement and cross-rivets used, as before described, for holding the tire in place.

Letter L refers to the holes in the body portion of the tire, which, as before described, are at right angles with the length of the tire and preferably run from bottom to top. These holes render the tire light, resilient, and strong to resist weight, as they may be made of any size and number required.

Letter M is the usual tire bolt or screw which secures the center channel, metal lining, and metal tire with flanges to the wooden rim of the wheel.

Letter N represents the grooves in the bottom of my tire, which run the whole length of the same and are constructed so as to receive the flanges of the center channel already described.

Having described the construction of my tire and its use, what I desire to cover by Letters Patent and claim is—

1. In a cushion-tire for wheels, the combination with an elastic core, of a flexible covering having longitudinal holes formed within the lower (that is toward the center of the wheel) portion of the covering adapted to receive anchor-strips or wires and anchor-pins adapted to pass across through the tire above the anchor-strips and through upwardly-extending flanges on the rim, as and for the purpose specified.

2. In a cushion-tire, the combination with the cellular core, of a flexible covering or sheath, a metal anchor-strip arranged between the core and the sheath, a channel-rim, and transverse retaining-pins extending between the tire and the anchor-strip and through the flanges of the channel-rim, substantially as described.

3. In a cushion-tire for wheels the combination with an elastic core having a longitudinal groove on the under side adapted to receive an upwardly-extending flange from the rim of a flexible covering to the core and pins adapted to pass through the tire and the flanges, as and for the purpose specified.

4. The combination in a wheel for vehicles, with a cushion-tire, of a rim having upwardly-extending flanges, and pins adapted to pass through the flanges, and the cushion-tire, as and for the purpose specified.

In testimony whereof I have signed my name to this specification in the presence of two subscribing witnesses.

A. H. BRINTNELL.

Witnesses:
 JOHN ROCKWELL,
 DOUGALL DINGMAN.